(12) United States Patent
Lorton et al.

(10) Patent No.: US 7,317,968 B2
(45) Date of Patent: Jan. 8, 2008

(54) METHOD AND SYSTEM FOR MANAGING AND OPERATING A PLURALITY OF FARM HOUSES

(75) Inventors: Brad W. Lorton, Dacula, GA (US); Douglas J. Niemeyer, Granger, IN (US)

(73) Assignee: CTB IP, Inc., Wilmington, DE (US)

( * ) Notice: Subject to any disclaimer, the term of this patent is extended or adjusted under 35 U.S.C. 154(b) by 703 days.

(21) Appl. No.: 10/674,282

(22) Filed: Sep. 29, 2003

(65) Prior Publication Data

US 2004/0123810 A1 Jul. 1, 2004

Related U.S. Application Data

(60) Provisional application No. 60/414,855, filed on Sep. 30, 2002.

(51) Int. Cl.
G05B 13/00 (2006.01)
(52) U.S. Cl. .................. 700/275; 702/188; 340/10.41; 705/1
(58) Field of Classification Search ............... 700/231, 700/241, 275; 701/213–215; 702/188; 705/1; 340/10.41; 236/49.3; 119/51.02
See application file for complete search history.

(56) References Cited

U.S. PATENT DOCUMENTS

| | | | | |
|---|---|---|---|---|
| 5,322,034 A | * | 6/1994 | Willham et al. | ......... 340/10.41 |
| 5,457,627 A | | 10/1995 | Cureton et al. | |
| 5,482,210 A | * | 1/1996 | Carey et al. | ............... 236/49.3 |
| 5,636,118 A | | 6/1997 | Brewster et al. | |
| 6,032,084 A | | 2/2000 | Anderson et al. | |
| 6,569,092 B1 | * | 5/2003 | Guichon et al. | ............ 600/300 |
| 6,868,804 B1 | | 3/2005 | Huisma et al. | |
| 6,901,369 B2 | * | 5/2005 | Cureton et al. | ................ 705/1 |
| 7,004,401 B2 | | 2/2006 | Kallestad | |
| 2003/0033057 A1 | | 2/2003 | Kallestad | |
| 2004/0031335 A1 | | 2/2004 | Fromme et al. | |
| 2005/0080567 A1 | | 4/2005 | Wieting et al. | |

(Continued)

FOREIGN PATENT DOCUMENTS

WO  WO 02/098213 A2  12/2002

OTHER PUBLICATIONS

Remote data capture Brochure, undated, Big Dutchman International GmbH, 1 page.

(Continued)

Primary Examiner—Leo Picard
Assistant Examiner—Douglas S Lee
(74) Attorney, Agent, or Firm—Harness, Dickey & Pierce, P.L.C.

(57) ABSTRACT

A system for monitoring, managing, and/or operating a plurality of farm houses on a plurality of farms. The system includes a controller and/or a monitor box in the farm house and a computer in communication with the controller for controlling and adjusting various parameters of the farm house or with the monitor box for monitoring the farm house. The system also includes a computer at an integrator's office that is operable to monitor and/or control various parameters from the farm house remotely. These parameters enable the integrator to coordinate operations with processing plants, feed mills, field service and hatcheries. It also enables the integrator to prepare various data reports for use by the integrator or others.

49 Claims, 5 Drawing Sheets

U.S. PATENT DOCUMENTS

2005/0161007 A1 7/2005 Huisma et al.
2006/0111035 A1 5/2006 Kallestad

OTHER PUBLICATIONS

Dicam Software, "All you ever wanted to know about Dicam", http://www.dicamusa.com/Software.aspx, printed Aug. 23, 2002, 2 pages.

Dicom Software, "Dicam Services", http://www.dicamusa.com/Services, aspx, printed Aug. 23, 2002, 1 page.

Chris Belyavin (Technical) Ltd., "Future Developments", http://www.flockdata.com/site/futute.html, printed Aug. 5, 2002, 2 pages.

Chris Belyavin (Technical) Ltd., "Flockdata Software", http://www.flockdata.com/site/flockdata.html, printed Aug. 1, 2002, 2 pages.

ROTEM, "Poultry", http://www.rotem.com/poutry.html, printed Aug. 19, 2002, 3 pages.

ROTEM, "Profile", http://www.rotem.com, printed Aug. 19, 2002, 2 pages.

ROTEM, "Communication", http://www.rotem.com/comm.html, printed Aug. 19, 2002, 2 pages.

ROTEM, "Hogs", http://www.rotem.com/hogs1.html, printed Aug. 19, 2002, 2 pages.

ROTEM, "New Products", http://www.rotem.com/new_products.html, printed Aug. 19, 2002, 3 pages.

Critical Wireless™, Connecting Your Machines to You: One-Stop M2M, 2004.

CTB, Inc., C-Collect™, Feed Scale Installation & Operator's Instruction Manual, May 2004.

CTB, Inc., C-Collect™, Monitor Box Installation & Operator's Instruction Manual, Oct. 2003.

Cumberland®, Ventilation Climate Controller Accessories, printed Jan. 2003.

* cited by examiner

METHOD AND SYSTEM FOR MANAGING AND OPERATING A PLURALITY OF FARM HOUSES

CROSS-REFERENCE TO RELATED APPLICATIONS

This application claims the benefit of U.S. Provisional Application No. 60/414,855, filed on Sep. 30, 2002. The disclosure of the above application is incorporated herein by reference.

FIELD OF THE INVENTION

The present invention relates to managing and operating a plurality of farm houses; more particularly, the invention relates to an integrator for remotely managing and operating a plurality of farm houses on a plurality of farms.

BACKGROUND OF THE INVENTION

Farmers have typically managed and operated farm houses, such as chicken houses and hog houses, by performing the day to day farm tasks manually. These tasks primarily included providing adequate feed and water to the housed animals or livestock. Over time, farmers have determined that controlling certain parameters could lead to higher yields and quality in the livestock. For example, temperature, humidity, ventilation, feed cycles and lighting all contribute to successful livestock and improved yields. Moreover, through the selective breading process, certain desired characteristics like meat yield have been modified. However, some selective breading may result in an animal that may be stressed very easily based upon changes in the surrounding environment. These types of animals require very specific conditions in order to thrive. Maintaining these specific conditions requires a significant amount of oversight and time to ensure the proper environment is maintained.

Control systems for farm houses initially started with simple analog controls, such as thermostats to control temperature in the farm house. Digital controllers soon followed and have generally replaced manual or analog controls in farm houses. By way of example and not limitation, CTB, Inc., of Milford, Ind. offers a Chore-Tronics® controller that is capable of allowing the farmer to monitor and control several parameters. These parameters are generally controlled automatically, via various sensors and actuators positioned throughout the farm house. The parameters controlled in a farm house, such as a poultry or hog house generally include, temperature, humidity, water, ventilation, timers for feeder and waterers, and timers for lights.

The farmer may typically adjust the farm house controller either on-site or through a processor, such as a personal computer (PC), that is in communication with the farm house controller. The PC may be located at the farmer's office on the farm or at a site remote from the farm. Integrators that provide the animals, feed and support, as well as harvest the mature animals, however, generally do not have access to any information from the farm houses. This can result in the integrators receiving different quality product from different farms, which is undesirable. For example, providing consistent weight for chicken breast meat or other desired meats is of critical importance to the integrator and its customers. Because of this, the integrator needs to properly schedule harvesting of the livestock to ensure the desired weight of the animal is reached when the animal is harvested. Also, feed delivery and ensuring that there is enough feed at each farm is also of critical importance to the integrator. If there is insufficient feed available, the animals may be stressed. If too much feed is delivered to the farm, a specialized truck may be required to pick up the excess feed at the farm adding additional cost to the integrator.

There is, therefore, a need by the integrators to monitor and possibly control the various farm houses it contracts with to ensure high quality, consistent and low cost yields.

SUMMARY OF THE INVENTION

In one of the various embodiments, a system for managing and operating a plurality of farm houses includes a monitor box and/or a controller in the farm house and a computer in communication with the monitor box and/or controller for controlling and adjusting the various parameters of the farm house. The system further includes a computer at an integrator's office that is operable to monitor the various parameters in the farm house remotely. These parameters enable the integrator to coordinate operations with processing plants, feed mills, field service and hatcheries.

In another of the various embodiments, a method for managing and operating a plurality of farm houses includes controlling the farm houses on the farm and monitoring the farm houses at an integrator's office. The farm houses are controlled on the farm by way of controllers positioned in each farm house and a computer in communication with the controllers to control and adjust the various farm house parameters. The method also includes monitoring data from the farm houses at the integrator's office. This data is then used to monitor and determine the efficiency and yield of the farm houses. The method is also used to coordinate delivery of feed from feed mills, transportation of livestock for the processing plant, providing reports for field service hands, and notifying hatcheries when new livestock needs to be delivered to the farm houses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments concerning a method and system for managing and operating a plurality of farm houses on a plurality of farms are merely exemplary in nature and are not intended to limit the invention, its application, or uses. It will be appreciated by those skilled in the art that the present invention is clearly not limited to a specific type of farm, but may be applied to any type of farm application, including for example, hogs, cattle, turkeys, and fish. Therefore, although reference may be made to a chicken house and poultry farm, simply for clarity, the present description and appended claims will be understood to not be so limited.

Figure 1:
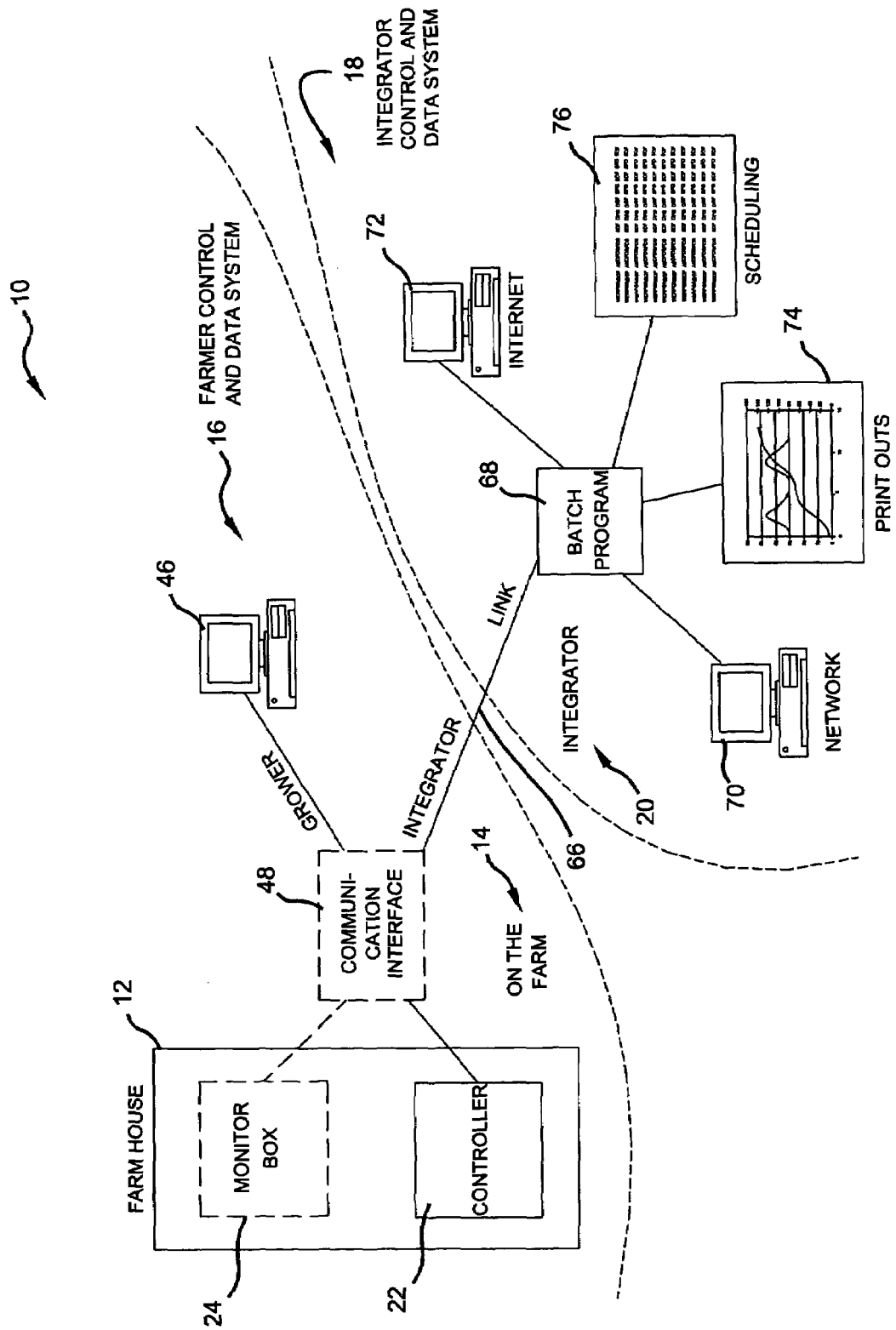
FIG. 1 is a schematic block diagram of a system for managing and operating a plurality of farm houses on a plurality of farms according to one of the various embodiments of the present invention.

Referring to FIG. 1, a system 10 for managing and operating a plurality of farm houses 12 located on one or more farms 14 is shown. The farm house 12 may be any type of farm house 12 housing any type of farm animal, such as chickens, turkeys, cattle, hogs, etc. For exemplary purposes only, the present invention will discuss managing and operating a poultry or chicken house 12. While FIG. 1 illustrates a single farm house 12 and a single farm 14, it will be understood that a plurality of farm houses 12 may be maintained on a single farm 14 or on multiple farms 14.

The system 10 for managing and operating the farm house 12 may include both a farm control and data system 16 that is typically located on the farm 14 and an integrator control and data system 18 that is typically operated by an integrator 20, which may be from a particular location or mobile, further discussed herein. Each farm house 12 within the system 10 may include at least one farm house controller 22 that is used to control various parameters within the farm house 12. By way of example and not limitation, the farm house controller may be the Chore-Tronics® controller that is offered by CTB, Inc. of Milford, Ind. Should another type of farm house controller be utilized, a monitor box 24 may be used in parallel with the controller 22 to monitor the controller 22 and provide the necessary information for data retrieval and control of the integrator 20. Thus, as described herein, the integrator 20 may receive data from the controller 22 or the monitor box 24, and may also control the farmhouse with the controller 22, if the system 10 is so designed.

In addition, with further detail to the controller 22 and/or the monitor box 24, either or both may include a memory storage system. The memory storage system may be any appropriate memory storage system, such as random access memory, flash memory, a hard drive, or other generally known memory storage device. Therefore, the information monitored or controlled may be stored by the memory device and may be downloaded to the integrator 20 or the integrator control and data system 18 or the farmer control and data system 16.

The download of data may occur at any appropriate time or any appropriate rate. For example, the systems may be automated to download data at a selected rate, such as every hour, once a day, once a month, or substantially continuously (i.e., real-time). Alternatively, the data may be downloaded at a selected time due to a selected instruction. Therefore, the integrator control and data system 18 may send an instruction to the monitor box 24 and/or the controller 22 to receive a data dump from the memory system.

In addition, as discussed above and further herein, the controller 22 may be able to sense or monitor data from each of the plurality of systems discussed herein as may the monitor box 24. If only one of the controller 22 and the monitor box 24 are provided in the farm house 12, only one may monitor the condition of the farm house 12. Nevertheless, if the controller 22 is provided, the controller 22 may both monitor and control the systems in the farm house 12. If the monitor box 24 is provided, the monitor box 24 may receive the information from the controller 22 or may receive inputs from the sensors or the systems positioned in the farm house 12. Therefore, the integrator control data system 18 may communicate with either or both of the controller 22 and the monitor box 24 to receive the selected data.

With further reference to FIG. 1, it will be understood that the farm house 12 may house any appropriate or selected livestock, such as chickens and hogs. In addition, the farm house generally includes at least one controller 22 and/or one monitor box 24. For clarity of the following discussion, the controls included in the controller 22 are able to control various parameters of the farm house 12, as discussed further herein. The controller 22 may be owned by the integrator 20 as a part of the integrator control and data system 18 or may be owned by the farmer and rented and used by the integrator 20 in the integrator control and data system 18. Similarly, the monitor box 24 may be owned and operated by the integrator 20 for the integrator control and data system 18 and simply be positioned in the farm house 12. Alternatively, the farm house 12 may only include the monitor box 24 which is then monitored and data sent to the integrator control and data system 18. Therefore, although the controller 22 and/or the monitor box 24 may be present within the farm house 12, it will be understood that the controller 22 and the monitor box 24 are not necessarily owned by the farmer or the grower and may be owned by the integrator 20.

Figure 2:
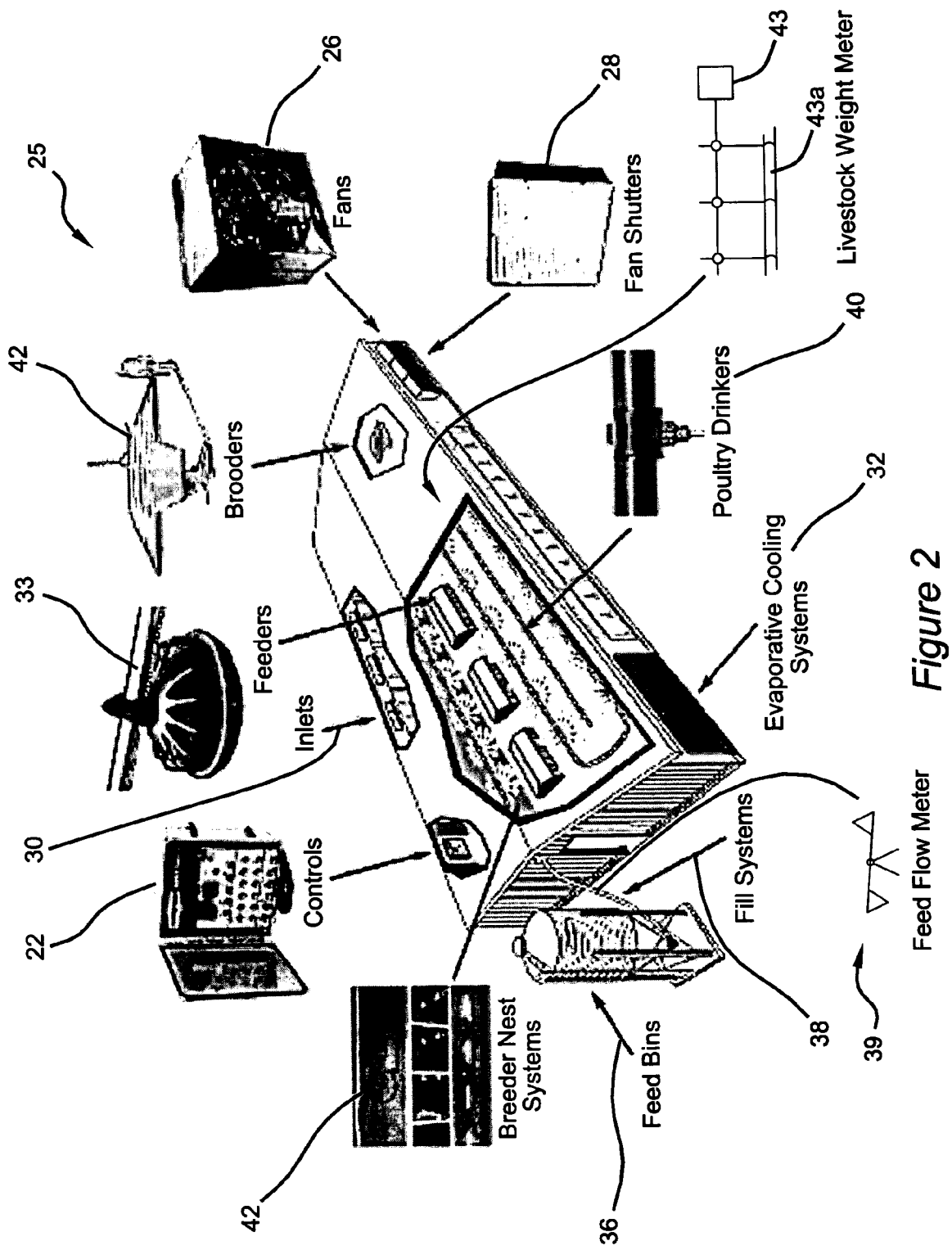
FIG. 2 is a perspective view of a poultry or chicken house illustrating the various systems that may be controlled and monitored within the poultry house.

An exemplary farm house is a poultry house 25, as shown in FIG. 2, the farm house controller 22 is able to monitor and control many parameters. The various systems that can be monitored and controlled by the farm house controller 22 include a ventilation system that is used to control the ventilation, in the poultry house 12. The ventilation system typically includes fans 26 that can be turned off and on, fan shutters 28 that may be used to open and close that allow for the pressure differentiation to allow the fans 26 to move air and inlet doors 30 to control the amount of fresh air intake into the farm house 12. The ventilation system, including the various components, may affect control parameters such as temperature, air quality, such as ammonia and $CO_2$ concentration, within the farm house 12, oxygen levels, and others.

Although temperature may be indirectly controlled, via the ventilation system, it may also be directly controlled by an evaporative cooling system 32 and brooders 33. The evaporative cooling system 32 can not only adjust the temperature parameter but also a humidity level parameter within the farm house 12 by drawing air through a wetted pad. Should heating be required within the poultry house 12, the controllable brooders 33 may be utilized in combination with the evaporation cooling system 32. Therefore, control parameters temperature, humidity, and the like may also be controlled in the farm house by the evaporative cooling system 32 and brooders 33.

The control parameters for feeding and watering of the chickens may be controlled by way of automated feeders 34 that are supplied by a feed bin 36 and a fill system 38. For example, the fill system 38 may include a flow meter 39 that is able to substantially precisely, within selected tolerances, measure the amounts of feed provided to the farm house 12 that is consumed by the livestock contained therein. For example, a flop or scale flow meter, generally known in the art, may be used as part of the fill system 38 to precisely determine the amount of feed provided to the feeders 34. Water is delivered by an automated poultry drinker system 40.

Automated breeder nest systems 42 may also be monitored and controlled by the farm house controller 22. The breeder nests 42 may assist in controlling the number of livestock produced in the farm house 12.

The monitor box 24 and/or the control box 22 may also be used to monitor the weight of the livestock, such as with a weight meter 43. The weight meter 43 may any appropriate meter, such as one that measures the force produced on a roosting rod 43a of a chicken roost. Therefore, the weight of the livestock may be monitored and other control parameters may be altered depending upon the monitored weight parameter. Also the weight parameter may be a result parameter, as discussed herein.

It should further be noted that other controls may also be performed by the farm house controller 22 and the above systems are merely exemplary systems and parameters that may be controlled. For example, monitoring livestock weight, air quality, such as $CO_2$ and nitrogen concentration, in and around the farm house 12, waste from the farm house 12, animal conditions, etc. As a further example, an animal scale or animal weight monitor may also be controlled by the controller 22 or monitored by the monitor box 24. Therefore, a weight combination of all the livestock or of each of the individuals within the livestock population may be monitored through the controller 22 or the monitor box 24.

As discussed herein, the monitor box 24 may also be included within the farm house 12, either alone or in addition to the controller 22. The monitor box 24 may be connected to the controller 22 such that information monitored within the farm house 12 may be used to determine selected control parameters by the controller 22. Alternatively, the controller 22 may include software, hardware, or combinations thereof to both monitor and control the various parameters of the farm house 12 and the monitor box 24 provides an interconnection between the controller 22 and a non-related system, such as the integrator data and control system 18. The controller 22 may also incorporate the features of the monitor box 24 directly into the controller 22, thereby eliminating the need for a separate monitor box 24. Therefore, the controller 22 and/or the monitor box 24 may owned or operated by the integrator 20 such that the integrator 20 may both monitor and control, as selected by the integrator 20, the farm house 12.

Returning to FIG. 1, the farmer control and data system 16 controls and monitors primarily the feeding and watering, as well as the internal environment of the farm house 12. This control system 16 is generally performed on the farm 14 by way of a computer 46 that is in communication with the controller 22 or monitor box 24 in the farm house 12. The computer 46 communicates with the controller 22 or monitor 24, via a communications interface 48. The computer 26 may be integrated into the controller 22 or the monitor box 24 or may be positioned remotely from the farm house 12. The communications interface 48 can consist of any type of interface capable of transferring control and data signals between the farm house 12 and the computer 46.

Figure 3A:
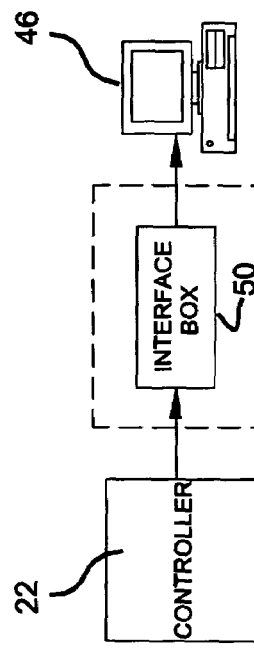
FIGS. 3A-3C illustrate various embodiments of a communications interface between a farm house controller and a computer.
Figure 3B:
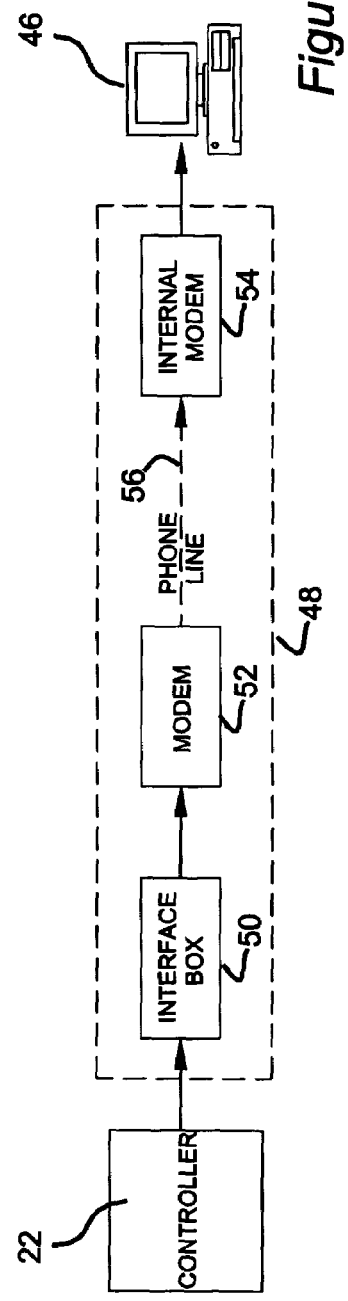
Figure 3C:
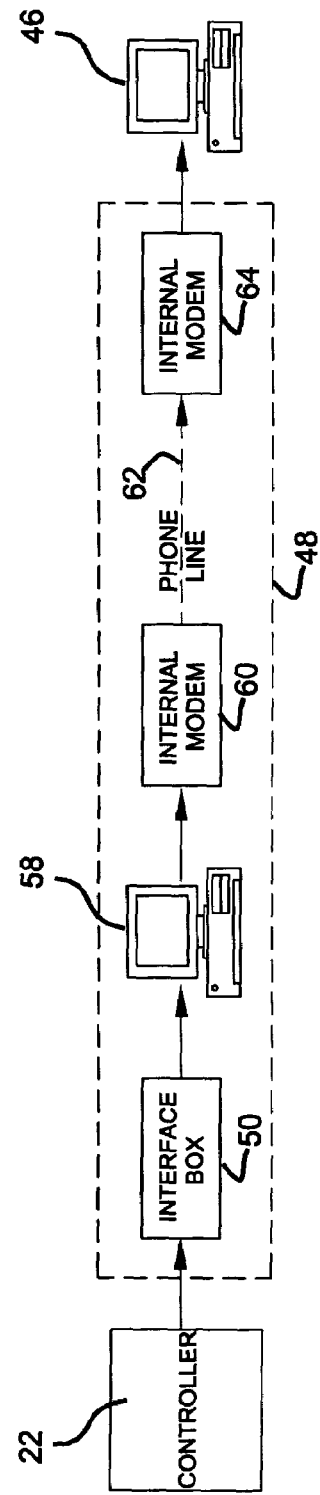

For example, as shown in FIGS. 3A-3C, various hardware communication connections are illustrated. As shown in FIG. 3A, the communications interface 48 includes an interface box 50 that is hard wired between the controller 22 and the computer 46 by twisted pair wire, Universal Serial Bus (USB) connections, RS 232 connections, or any other type of connection. The interface box 50 may include only a single connection to the computer 46, that may be positioned on the farm 14, or even within the farm house 12, and may also include a connection to the integrator 20 as discussed herein. As shown in FIG. 3B, communications interface 48 includes the interface box 50, as well as external modem 52 and an internal modem 54 within the computer 46. This type of communication interface 48 enables remote access by the farmer and control of the controller 22, via a communications channel that may be wireless, internet connection, and/or over a phone line 56. This enables the farmer or grower to remotely access and adjust the controller 22 either on the farm 14 or at a site remote therefrom. A third type of communication interface 48, is shown in FIG. 3C, consists of a connection to various networked computers. In this regard, the communication interface 48 includes the interface box 50 that is hard wired directly to a network computer 58 that forms part of a network. The computer 58 communicates to the computer 46 by way of an internal modem 60, over a selected connection such as a wireless channel, internet connection, and/or a phone line 62 and internal modem 64, associated with the computer 46. While these different embodiments of a communication interface 48 have been illustrated, it will be understood that these embodiments are merely exemplary and any other type of two-way unsecured or secured communication channels may be employed. For example, wireless, satellite, optical, or any appropriate communications may also be used for the communications interface 48.

The computer 46 may operate with various software platforms to control and receive data from the controller 22 or the monitor box 24. An exemplary software package is C-Central software provided by CTB, Inc. of Milford, Ind., which may be used in combination with the Chore-Tronics Controller®, that may be used as the controller 22, also provided by CTB, Inc. The control and data information passed through the communications interface 48 is generally unsecured and unencrypted. This unsecure two-way communication enables the grower or farmer to easily access the controller 22, both on the farm 14 or at a site remote from the farm 14 through the appropriate communication interface 48. Nevertheless, a secure and/or encrypted connection may be used. The farmer or grower may typically monitor and control feeding and watering of the livestock. The farmer may also monitor and control the environment in the farm house 12, which includes temperature, humidity, ventilation and lighting control of the farm house 12, utilizing the various systems shown in FIG. 2. The farmer control and data system 16 also enables the farmer to store data over time, such as temperature, as well as provide warnings if one of the controlled parameters is out of its operating range or tolerance, such as high or low temperatures. This enables the complete environmental control of the farm houses 12 by the grower or farmer, via the farmer control and data system 16.

The integrator control and data system 18 owned and/or operated by the integrator 20 at a selected location communicates with the controller 22 and/or monitor box 24, if selected, in the farm house 12, via a two-way secure or unsecured communications link 66. Here again, this communications link or channel 66 may be of any type, including a hard wire, satellite, optical, and/or wireless communication connection or channel. The integrator control and data system 18 may include any type of software capable of communicating with the controller 22 and/or the monitor box 24 for monitoring parameters within the farm house 12, as well as capable of scheduling feed deliveries, harvest schedules, servicemen reports, etc. An exemplary integrator control and data system 18 is the C-Collect system developed by CTB, Inc. of Milford, Ind., according to the teachings of the present invention.

The integrator control and data system 18 in the system 10 may be primarily used for monitoring and controlling result parameters in the farm house 12, while the farmer control and data system 16 may be primarily directed to monitoring and controlling control parameters in the farm house 12. As discussed above control parameters generally relate to those parameters of the farm house 12, such as feed rate, environment, and the like. Result parameters generally relate to the parameters of the livestock produced in the farm house 12. Therefore, result parameters may include livestock weight, livestock size, livestock health, rate of achievement of standard result parameters, and the like.

In this regard, the integrator 20, in contrast to the grower or farmer is typically responsible for everything in the farm process, except for the daily tasks regarding the farm house controls. As indicated above, and further discussed herein, the integrator 20, including the integrator control and data system 18, may communicate with the monitor in a box 24 and/or the controller 22 over the communication link 66 to the communication interface 48. Therefore, the integrator 20 may monitor the conditions of the farm house 12 through either the controller 22 or the monitor box 24. As discussed herein, the integrator 20 may use the data collected from the monitor box 24 or the controller 22 for any appropriate purpose. In addition, the integrator 20 may also control the farm house 12 with the controller 22 through the communication interface 48. Therefore, the integrator 20, as discussed further herein, may only monitor the farm house 12, in a generally real time manner, or may also control and monitor the farm house 12, also in a substantially real time manner. Therefore, the integrator 20 may not only monitor result parameters, but may also monitor control parameters and perform actions or send instructions based upon the monitored control parameter. The instructions, by way of example, may be to the farmer, one of the control systems, a service man, or a customer.

In a specific example, and not intended to be limiting, a poultry integrator may generally be responsible for providing the chicks to the farmer, maintaining feed bin inventories, coordinating feed delivery, providing technical assistance when necessary, and coordinating the harvest of mature chickens to be delivered to customers, such as processing plants and retailers. The data sent by the controller 22 and/or monitor box 24 to the integrator control and data system 18 may be either initially encrypted or non-encrypted at the controller 22 and/or the monitor box 24 before being transferred through the communications interface 48 on the two-way communications link 66. This data is then received at a batch program 68, which decrypts the data, if encrypted, for use by the integrator 20. This information may then be made available on the integrator's network 70 or provided on the internet 72 to selected users. This data can also be used to generate data printouts 74, as well as be used for scheduling 76 with other operations, such as the processing plant, feed mills, hatcheries, etc., further discussed herein.

As mentioned above, the integrator control and data system 18 may be primarily concerned with result parameters or result monitoring of raw data provided to it over the communications link 66. It should also be understood, however, that the integrator control and data system 18 may also control the farm house parameters and environment, via the controller 22 similar to the way the farmer or grower on the farm 14 may control the farm house, via computer 46. The parameters may be monitored for any appropriate reason and the following are merely exemplary and not limiting or inclusive.

The integrator 20, as discussed above, has the integrator link 66 through the communication interface 48 with either/or the monitor box 24 and the controller 22. The communication link 66 may be any appropriate communication link. The communication link 66 may be a land line link, such as a phone line, cable network or cable modem line, internet connection, or may also be a wireless connection such as a cellular connection, a satellite connection, or any other appropriate connection. Nevertheless, the integrator 20 is able to communicate through the communication interface 48 with the farm house 12. The integrator 20 may also be able to communicate with the grower computer 46 through the data link 66. Therefore, the integrator 20, as discussed above, may control the controller 22 either directly through the communication interface 48 or through the grower computer 46, depending upon the selected set-up. Nevertheless, the integrator 20 is not simply limited to receiving information from the controller 22 or the monitor box 24, depending upon whether both are present, but may also control the controller 22 through the communication interface 48.

As discussed above, one result parameter includes the weight of the livestock, such as the bird weight. This weight is used to determine and coordinate the proper harvest schedule. Feed consumption or flow rate results are monitored in order to determine feed delivery schedules to the farm 14. Mortality rates of the livestock are monitored to ensure that the proper environment is being maintained in the farm house 12. Air quality readings, such as carbon dioxide and monoxide and ammonia readings, may also be monitored by the integrator 20 to ensure that any local, state or federal regulations are met regarding air quality and health of the animals in the farm house 12. Animal welfare conditions may also be monitored by the integrator 20 by way of monitoring different environmental parameters, feed and water delivery parameters or any other relevant parameters, to confirm that the livestock are within and that the growers are complying with appropriate animal welfare conditions. The temperature, humidity, ventilation and lighting are also monitored by the integrator 20 and compared to selected standards or optimal parameters to confirm that these parameters are being met within each farm house 12 on each farm 14 monitored by the integrator 20.

In this regard, a typical integrator 20 may have contracts with several farms 14 where each farm includes several farm houses 12. This may include up to about 150-200 farms 14 and over 500 farm houses 12. The integrator control and data system 18 within the system 10 enables the integrator 20 to monitor each of the farms 14 it contracts with and/or owns, as well as each of the farm houses 12, located on each of the farms 14. This enables the integrator 20 to further compare operations, such as control parameters, of farm houses 12 to determine which of the farm houses 12 operate more efficiently or yield the best and highest quality product, generally determined with the result parameters. The control parameters of these particular farm houses 12 can then be compared with farm houses 12 that are not operating as efficiently or providing as high a yield, again generally determined with the result parameters. This enables the integrator 20 to improve the other farm houses 12, thereby resulting in a more uniform quality and yield within each farm 14. This information may also be shared across farm houses 12 and across entire farms 14. It is up to the integrator 20, however, to determine who and what data may be shared or viewed by others.

Nevertheless, according to various schemes, as discussed herein, the integrator 20 may standardize or determine optimal control parameters or various farms to achieve the best results as measured by the result parameters. As a simple example the integrator may compare a feed rate of a first farm house and a second farm house and then compare the rate which the livestock reach a selected livestock weight. If one farm house achieves the selected result parameter faster the integrator 20 is able to determine a better control parameter to achieve the selected result parameter. It will be understood, however, that many control parameters and many farmhouses may be monitored and compared to determine the best control parameter. Also, many other result parameters may be considered when determine the optimal control parameters.

Figure 4:
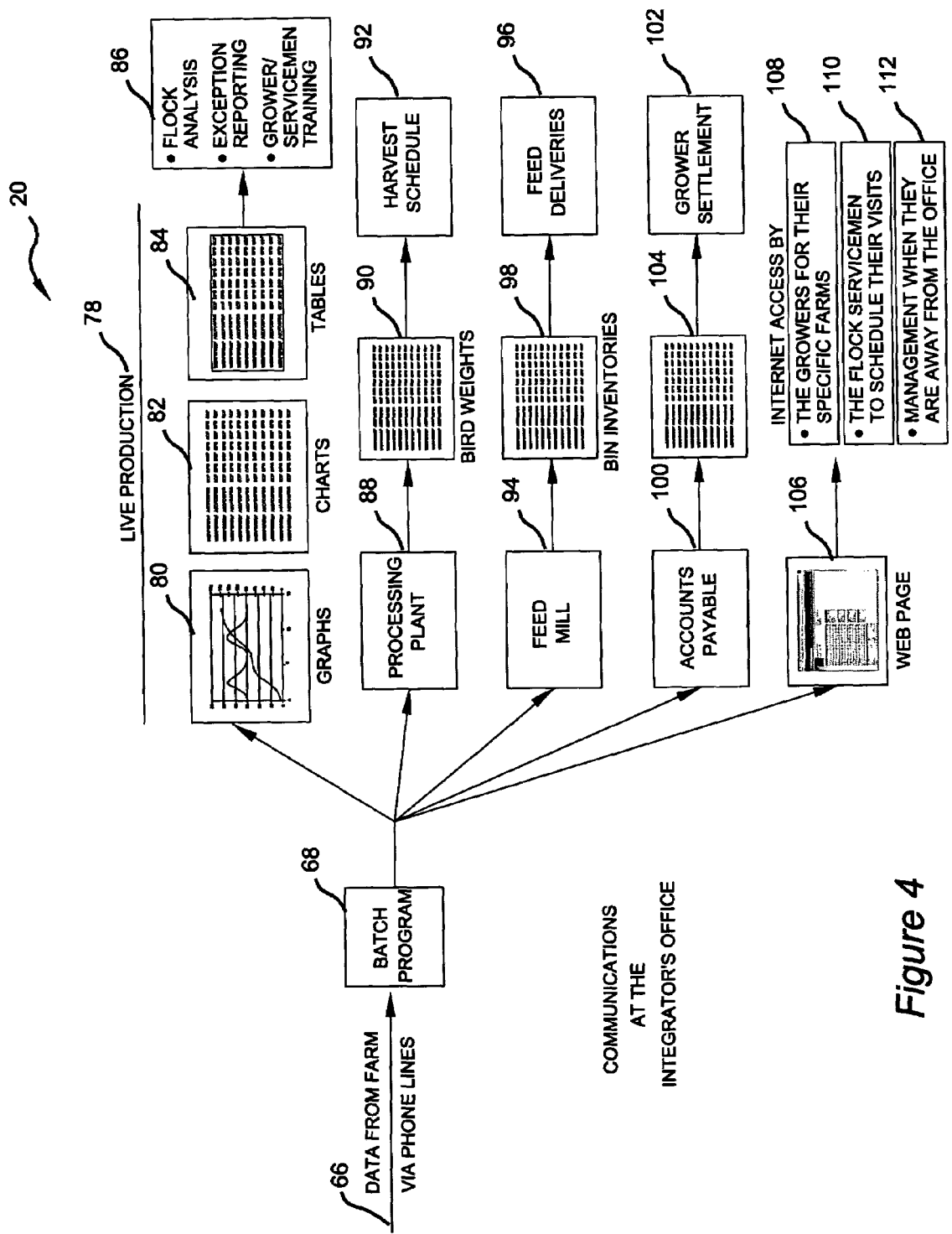
FIG. 4 is a schematic block diagram illustrating the communications at an integrators office, based upon data delivered from at least one farm.

Referring to FIG. 4, exemplary details regarding what the integrator 20 can do with the raw data collected from each farm 14 in the system 10 is illustrated. Again, the data on the communication link 66 may be either secure encrypted data or non-secure that is delivered to the integrator 20 and processed by the batch program 68. This data is generally only provided to the integrator 20 and not accessible by the farmer on the farm 14. Again, the integrator 20, however, determines what information and data to make available to others and who may receive the selected data.

The integrator 20 may monitor the live production 78 within each farm house 12 by way of graphs 80, charts 82, and tables 84 to support flock analysis, exception reporting and grower/servicemen training 86. This live production monitoring 78 includes monitoring the environment within the farm house 12 to ensure that the environment is within a list of standards. As discussed in further detail herein, the data collection and communication from the controller 22 and/or the monitor box 24 may be substantially real time. Therefore, the integrator 20 may receive the data through the link 66 substantially as rapidly as the integrator 20 desires. Therefore, the integrator 20 may desire to receive a data uplink or data set at a selected rate, such as once a day or more or less often, as selected, such that the integrator 20 may perform real time analysis and scheduling based on the data received. Therefore, the integrator 20 may select to have data sent over the link 66 at a selected rate so that a selected action may occur at a selected rate, such as rate of delivery, animal pickup, and other appropriate actions. Therefore, the integrator 20 can perform autonomously or assist the farmer on the farm 14, or request the farmer perform certain actions according to the data collected.

For example, temperature data will be transmitted, via the secure or unsecure link 66 at a selected sample rate and compared to a required or selected temperature. Should the temperature ever fall outside the required and selected temperature window, flags can be set and identified within the graphs 80, charts 78, or tables 84. This leads to printing of exception reports 86 identifying that certain parameters are outside the required standards. Likewise, feed consumption, water consumption, humidity levels and lighting can also be monitored similar to the temperature to confirm compliance with desired standards that have various adjustable tolerances. This information is used in the flock analysis, exception reporting, as well as for providing information to the grower/serviceman 86. The information may be provided for growers/servicemen training but the information may be provided to the growers/servicemen for providing real time solutions to the flags or exception reporting. Therefore, an exception or an indication that one of the parameters is not being met may create a flag or exception report that must be attended to by a selected serviceman or grower. Therefore, the integrator may collect the data through the communication link 66 and the integrator control and data system 18 may provide the exception report such that the grower/serviceman may perform the appropriate task to solve the issue.

In this regard, the integrator 20 may provide certain information to the grower or farmer in order for the farmer to improve its quality or yields. For example, the integrator 20 may monitor numerous farms 14 each containing several farm houses 12. By identifying which farms 14 or farm houses 12 are operating efficiently and providing the highest yields, the control parameters from these farm houses 12 can be provided to the other growers or servicemen monitoring the other farms 14 to provide a more uniform harvest throughout the integrator's system 10.

The integrator 20 can also automate its entire operation based upon the data gathered by the integrator control and data system 18 within the system 10. For example, the integrator 20 can coordinate with its processing plants 88 by monitoring bird weights 90 in order to generate harvest schedules 92. For example, should the integrator 20 have a client that requires birds having a particular weight in a selected period, such as after three weeks, the integrator 20 can analyze the bird weights from the various farms 14 and even in each farm house 12 to select which farm houses 12 that may be ready for harvesting in three weeks with the proper bird weights. This provides an accurate harvest schedule 92 for the integrator 20 that can be used by the processing plant 88. This may allow the processing plant 88 to schedule a pick-up of the proper number of birds at the proper farm 14 in the proper farm house 12 on the required day in order to meet the three week delivery to the desired or selected customer. This information can also be provided to each processing plant 88 that the integrator 20 contracts with or owns, via the internet connection 72. Again, any connection type may be used and the connection may be secure or not.

The integrator 20 can also inform the feed mill 94 when feed deliveries 96 are required, based upon monitoring of feed bin inventories 98. In this regard, the integrator 20 may have contracts with several farms 14 and may thus, be responsible for feed delivery 96 from several feed mills 94 in order to ensure that the bin inventories 98 at each farm 14 are met. By monitoring the feed consumption substantially in real time or continuously of each farm house 12 on each farm 14, as well as the bin inventories 98, the integrator 20 can easily schedule feed deliveries 96, also substantially in real time, at appropriate times directly with the feed mills 94. Again, these feed deliveries 96 can be scheduled, via internet access 72, or any appropriate communication, provided to the feed mills 94 by the integrator 20. Again, as discussed above, the integrator 20 may communicate the feed mills 94 without communication with the farmer on the farm 14. The integrator 20 that receives the data over the communication link 66 provided the controller 22 and/or the monitor box 24 sends the information over the selected connection, such as the internet 72, to the selected number of the several feed mills 94 to ensure that feed is sent to the appropriate farm house 12 at a selected time.

The integrator 20 may also integrate its account payable system 100 into the integrator control and data system 18 to provide for grower payments or settlements 102, based upon generating reports 104 from data gathered from each farm house 12. These reports 104 can include when the livestock has been harvested and whether or not the livestock has met the required weight. Quality of the livestock can also be monitored. All of these factors effect the growers settlement 102.

The integrator 20 may also provide data and reports through the internet 72, via the integrator's web page 106. The web page 106 can be password protected and accessible by the growers 108, as well as flock servicemen 110 or by the integrator's management 112 when they are away from the integrator's office 20. For example, the grower 108 for a specific farm can access the web page 106 to review reports generated by the integrator 20 to help assist the grower in running and managing the farm house 12. This information can include how to refine the adjustment to the internal environment in the farm house 12 to provide higher yields and higher quality products. The flock servicemen 110 that work for the integrator 20 may also access the web page 106 to schedule their visits to the various farms 14, as well as generate and receive exception reports or other data that can assist in the flock servicemen's inspection of the particular farm 14. For example, should a particular farm 14 have a parameter falling outside a standard, such as temperature, the servicemen 110 can check the corresponding systems within that particular farm house 12 on that particular farm 14, based upon the reports and information provided by the web page 106. Management 112 of the integrator 20 can also access the web page 106 remotely if management 112 is not in the office 20.

Figure 5:
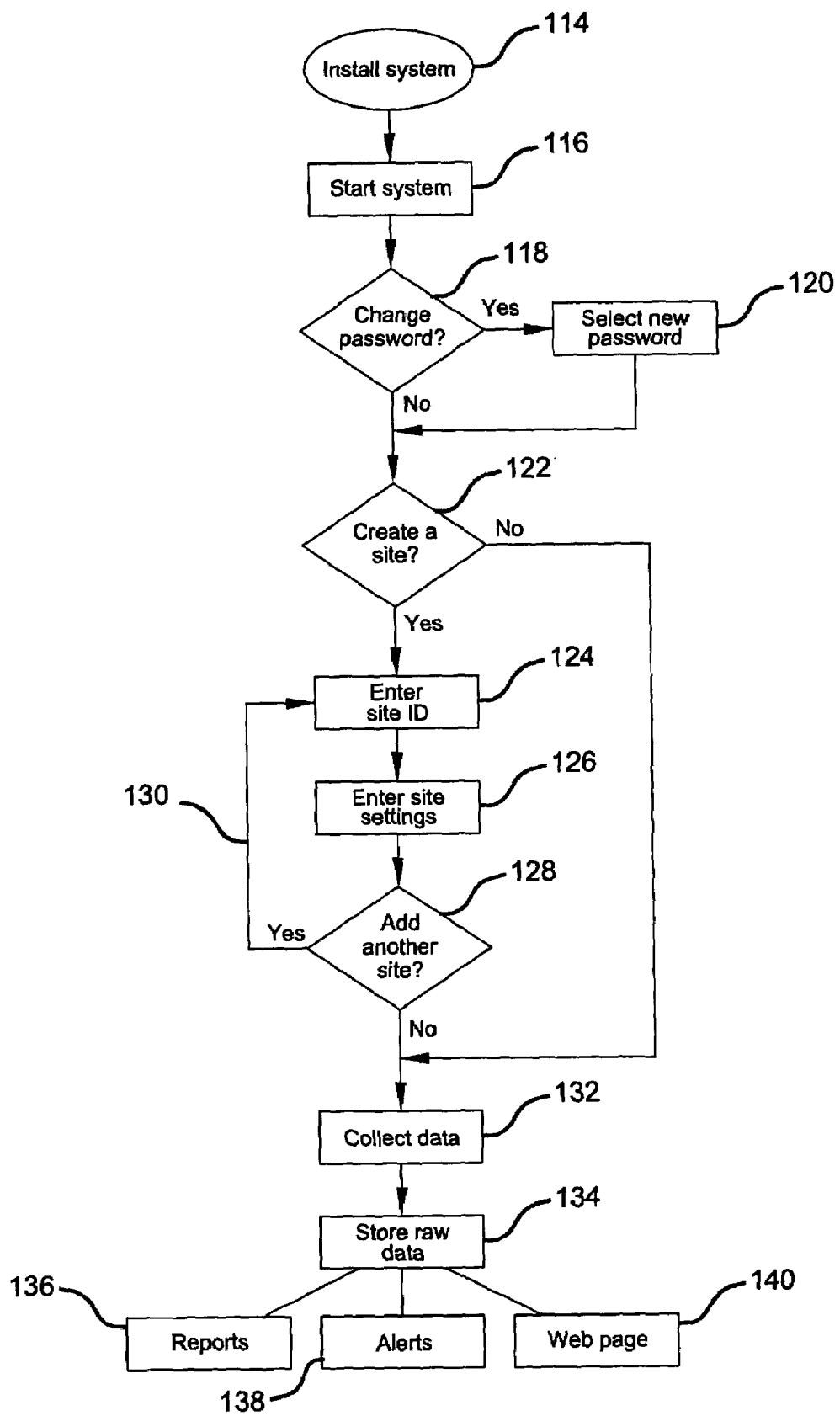
FIG. 5 is a flow-logic diagram illustrating the method for managing and operating the plurality of farm houses according to the present invention.

Turning to FIG. 5, a method for utilizing the integrator control and data system 18 within the system 10 is illustrated. The method begins at block 114, where the integrator control and data system 18 is installed. Once the system has been installed, the method proceeds to the system start-up block 116, which starts the operation of the integrator control and data system 18. Once this system has been started, the user is prompted whether or not it would like to change the password at decision block 118. Should a user decide to change the password 118, the method proceeds to block 120 where a new password is selected. If the user does not change the password, the method proceeds to decision block 122, which prompts whether or not the user wishes to create a site. This site corresponds to adding an additional farm 14 to be monitored by the integrator 20. If the answer to the decision block 122 is yes, the method proceeds to block 124, where the site ID is entered. The site ID may consist of a unique ID to identify the particular farm 14 that can include any appropriate information, such as the name and telephone number of the farm site. Once the unique ID is entered at block 124, the method proceeds to block 126.

At block 126, site settings are entered. These site settings identify what parameters are to be monitored and the time intervals in which to sample the monitored parameters. Folders are also created for storing data for each particular site. The settings can also identify at what particular dates and times the monitored parameters should be sampled. The settings can also include when this information should be downloaded by the integrator control and data system 18. Once the parameters to be monitored are identified and the sample time or rate set, the method proceeds to decision block 128. At decision block 128, the user is prompted whether or not to add an additional site. If so, the process proceeds back to block 124, via 130. Should all of the sites be entered, the method proceeds to block 132. At block 132, the method proceeds to collect the data from the various farms 14. For example, data regarding feed flow, temperature, or animal weight may be collected.

The data is collected sequentially by gathering data from each site one after the other at the specified collection dates and times and at the specified sample rates. The collected data is time stamped and marked accordingly for use later. The header section of the data may also contain identification information about the particular farm 14 or site ID. Once the data is collected, the method proceeds to block 134 where the raw data is stored. The system 18 may utilize a single common folder to receive incoming files. The file naming convention can be random, sequential, based upon farm number, house number and date and time. Once the raw data is properly stored at block 134, the method proceeds to either providing various reports 136, various alerts 138 or various web page access updates 140. As discussed herein, the reports 136 and the alerts 138 may be provided or sent using any appropriate method. Both the reports 136 and the alerts 138, however, may also be provided on the web page 140, such as an integrator web page 106, for access by selected individuals such as the grower 108, the servicemen 110, or various management or workers 112.

The reporting capabilities block 136 may include raw data, derivative data, comparison to standards, and statistical analysis that may be presented both in column and graphical views. Moreover, any other type of reports may also be generated with the understanding that the enclosed reports are merely exemplary. Each column can include various parameters of data sampled over time such as temperature and humidity, while other columns can include averages or other mathematical derivations of the other columns. Raw data column definitions define the data in each raw data column that may be received from the controller 22 and stored in the system database. Derivative columns are defined as the calculation results of mathematical operations performed on raw data columns and/or other derivative columns. Derivative columns may be limited to functions that can be expressed as row operations on a single row of data containing the derivative value. Derivative data column definitions define a "formula" or "calculation" performed to derive the derivative column from the raw data. Derived column set-ups may consist of column name, moving average, N-points or N-minutes, N (as a long integer), and formula. Users may be able to select from predefined formulas or create user defined formulas. Standards for all raw and derivative columns may be assigned within an "assigned standards" dialog box. A spreadsheet like grid will display all column names, and based upon age, data will be entered directly into the grid which will then be stored in the database. Administrators will assign user IDs, passwords and permissions for all users of the program and web interface. All user information is stored securely within the system database. Only users with administrative rights may access the application setups and configuration capabilities. Reports and charts may have the option of displaying raw data columns, derivative data columns, moving averages for any raw or derivative column, regression lines, correlation analysis, column totals and averages, column coefficient of variance, column standard deviation, and groupings and subtitles by any variable (raw or derivative).

In the alerts block 138, all defined alerts may be displayed in a spreadsheet like grid showing which farms 14 have data outside the normal range as defined by the standard minimum and maximum values for a selected time period. The time period display may be concurrent with the data collection interval specified in the site setting block 126. Based upon predefined standards, each defined raw and derivative data column may have a "yellow" and "red" minimum and maximum value that can be assigned and stored in the database. Monitoring of collected data for values outside of specified ranges may be executed and in the event that unaccepted values are encountered, a flag in any appropriate form, such as in the form of a sound or a message can occur.

In the web page block 140, the web page extension may provide access to limited reporting functions through the Internet or a company Intranet for contract producers (growers) and technical advisers (serviceman). The web page extension 140 may also provide the ability to select, view and print predefined reports. The web interface 140 may also allow serviceman or others to insert comments into the data which can be reviewed by the integrator 20.

The use of the system 10 thereby enables the integrator 20 to substantially and completely automate its entire operations with contract farms 14 or farms 14 that it owns. This enables the integrator 20 to monitor and control operations on the farm house 12 directly. Alternatively, the integrator 20 may have the farmer control the operations within the farm house 12, either alone and/or according to instructions from the integrator 20, as the integrator monitors the farm house 12. The system 10 also enables the integrator 20 to coordinate other necessary operations. These operations include coordinating with processing plants, feed mills, hatcheries, payments, servicemen, and others. The system 10, therefore, provides the capabilities to the integrator 20 to monitor and control all operations in the farm house 12, provide for more uniform and higher quality products and yield, resulting in meeting the integrator customer's desires more effectively.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrator system to assist in providing a selected product from a farm house having a structure substantially enclosing an area and substantially covering the area, comprising:
    an integrator processor positioned a distance from the farm house, said integrator processor operable to determine an optimal quality and yield of the selected product from the farm house; and
    a monitor box positioned in the farm house to monitor a selected criterion at the farm house;
    wherein said integrator processor receives data from said monitor box regarding said selected criterion of the farm house;
    wherein said integrator processor determines a substantially real time optimal condition for the farm house in consideration of the optimal quality and yield of the selected product from the farm house;
    wherein said integrator processor produces a signal based upon a comparison of the received data from said monitor box and the substantially real time optimal condition for the farm house.

2. The integrator system of claim 1, further comprising:
    a controller to affect the selected criterion;
    wherein said integrator processor communicates said substantially real time optimal condition to said controller.

3. The integrator system of claim 2, wherein said signal based on a comparison of the received to data from said monitor box and a substantially real time operable condition for the farm house includes an instruction to said controller to change a condition of the farm house to obtain the selected criterion at the farm house.

4. The integrator system of claim 3, wherein said integrator processor is substantially controlled by a user substantially unassociated with directly controlling the farm house.

5. The integrator system of claim 1, wherein said selected criterion includes at least one of a temperature, a humidity, a feeding, a watering, a livestock weight, an air quality, an animal waste, a lighting, a feed inventory, a feed flow rate, and combinations thereof.

6. The integrator system of claim 5, further comprising:
    a controller operable to control at least one of a ventilation system, a thermostat, a thermometer, an evaporative cooler, a feeder bin, a filler system, a brooder, a feeder, a breeder house, a fan, a fan shutter, a waterer, a light, a waste outlet, and combinations thereof to achieve the substantially real time optimal condition;
    wherein said integrator processor is operable to instruct said controller to control at least one of said a temperature, a humidity, a feeding, a watering, a livestock weight, an air quality, an animal waste, a lighting, a feed inventory, a feed flow rate, and combinations thereof to achieve the substantially real time operable condition.

7. The integrator system of claim 1, wherein said integrator processor receives data from said monitor box on a substantially secure data link.

8. The integrator system of claim 7, wherein said data link is selected from at least one of a direct hardline connection, modem connection, a wireless connection, and combinations thereof.

9. The integrator system of claim 1, further comprising:
    a farm house computer able to control the selected criterion at the farm house;
    wherein said integrator processor communicates over a selected data link with said farm house computer to control the selected criteria from the integrator processor.

10. The integrator system of claim 1, wherein a monitor box includes a plurality of monitor boxes each positioned at a different farm house to monitor a selected criterion at each of the plurality of farm houses.

11. The integrator system of claim 10, wherein said integrator processor compares the selected criterion monitored by each of the plurality of the monitor boxes relative to a result criterion to determine an optimal control criterion to achieve a selected result criterion and the optimal quality and yield of the selected product from each of the plurality of farm houses.

12. The integrator system of claim 11, wherein at least a sub-plurality of the plurality of monitor boxes to positions at the farm houses are at different farms.

13. The integrator system of claim 1, further comprising:
    a controller to control the farm house regarding said selected criteria;
    wherein said monitor box and said controller are substantially a single unit wherein the monitor box is able to monitor the selected criterion and the controller is able to control the selected criterion based on the information monitored by the monitor box.

14. The integrator system of claim 1, further comprising:
    a controller able to control the farm house to achieve the substantially real time optimal conditions;
    wherein said monitor box substantially only monitors the selected criterion and is a separate device.

15. A method of monitoring and controlling a farm house for production of a selected item, comprising:
    selecting a farm house owned by a first party;
    selecting a parameter, by a second party, of the farm house to monitor;
    determining, by the second party, an optimal quality and yield of the selected item from the farm house;

selecting, by the second party, a parameter tolerance in consideration of the optimal quality and yield of the selected item from the farm house;

monitoring said selected parameter;

comparing the monitored parameter to the selected parameter tolerance; and sending instructions from the second party to the first party to perform a selected action based on the comparison of the monitored parameter to the selected parameter tolerance.

16. The method of claim 15, wherein selecting a farm house includes selecting a farm house producing a selected livestock.

17. The method of claim 15, wherein selecting a parameter includes selecting at least one of a feed amount, a water amount, a humidity, a temperature, a ventilation, a humidity, an animal waste, a feed flow, and combinations thereof.

18. The method of claim 17, further comprising:
comparing at least one of the selected parameters to at least one of a selected result parameter, selected from a group including: livestock weight, livestock size, livestock health, livestock achievement, and combinations thereof;
wherein the comparison of the selected parameter and the selected result parameter is used by said second party when sending the instructions.

19. The method of claim 15, further comprising:
selecting a second farm house;
selecting a second parameter, by said second party, of the second farm house to monitor;
monitoring said selected said parameter in said selected second farm house;
comparing the monitored first parameter and the monitored second parameter to determine a best parameter of the first parameter and the second parameter,
wherein determining the optimal quality and yield of the selected item from the farm house includes consideration of the best parameter.

20. The method of claim 19, wherein the best parameter is determined as a parameter that achieves a result parameter within a selected tolerance.

21. The method of claim 19, wherein determining the best parameter is substantially real time;
wherein the sent instructions from the second party to the first party includes sending the best parameter to control the farm house.

22. The method of claim 15, further comprising:
said second party sending an instruction to a third party to perform a selected action at the selected farm house to achieve the monitored parameter within the selected parameter tolerance.

23. The method of claim 22, wherein said third party includes at least one of a party selected from a group including a feed mill, a serviceman, a livestock transfer, and combinations thereof.

24. A method of producing a selected outcome from a farm house, comprising:
selecting a first farm house at a first position;
monitoring a first control parameter within the selected first farm house;
monitoring a first result parameter of a first product produced in the first selected farm house;
selecting a second farm house at a second position;
monitoring a second control parameter within the selected second farm house;
monitoring a second result parameter of a second product produced in the second selected farm house; and a processor comparing at least two of the monitored first control parameter within the selected first farm house, the monitored first result parameter of the first product produced in the first selected farm house, the monitored second control parameter within the selected second farm house, and the monitored second result parameter of the second product produced in the second selected farm house.

25. The method of claim 24, wherein said processor comparing is substantial continuous at a selected rate.

26. The method of claim 25, wherein said rate is substantially real time such that said processor compares at least two of the monitored first parameter within the selected first farm house, the selected first parameter of the first product produced in the first selected farm house, the monitored second parameter within the selected second farm house, and the monitored second parameter of the second product produced in this second selected farm house in a substantially real time manner.

27. The method of claim 24, further comprising:
positioning a first controller in the first farm house;
positioning a second controller in the second farm house;
controlling the first controller and the second controller to control at least one of the first monitored controlled parameter and the second monitored controlled parameter to achieve the better of the monitored first result parameter and the monitored second result parameter.

28. The method of claim 27, wherein the better of the monitored first result parameter and the monitored second result parameter includes comparing monitored first result parameter and the monitored second result parameter to a selected standard result parameter and achieving the least difference.

29. The method of claim 24, further comprising:
forming a Internet based webpage operable to display at least one of the monitored first control parameter, the monitored first result parameter, the monitored second control parameter, and the monitored second results parameter;
accessing the webpage to obtain an instruction.

30. The method of claim 29, wherein the instruction includes an instruction to control at least one of the selected first farm house and the selected second farm house to achieve at least one of the monitored first control parameter and the monitored second control parameter within a tolerance of a selected standard control parameter.

31. The method of claim 24, further comprising communicating a data set from at least one of a first monitor box monitoring the first control parameter and a second monitor box monitoring the second control parameter to said processor over a data link.

32. The method of claim 31, wherein said data link is selected from at least one of a direct connection, a modem connection, a network connection, and a wireless connection.

33. The method of claim 31, wherein said data link is a secured data link.

34. The method of claim 24, further comprising:
producing a signal based upon the comparison of said processor; and
transmitting the signal to at least one of a serviceman, a grower, an executive, a feed mill, a processing plant, a livestock harvester, and combinations thereof.

35. The method of claim 24, wherein said processor is further able to compare at least one of the monitored first control parameter, the monitored first result parameter, the monitored second control parameter, and the monitored second result parameter to at least one of a selected standard result parameter and standard control parameter.

36. The method of claim 35, further comprising:
producing an alert when said comparison to the at least one of the standard control parameter and result parameter are outside of a selected range.

37. The method of claim 36, wherein said alert includes an audible signal, an electronic message, a phone contact, a web page alert and combinations thereof.

38. The integrator system of claim 1, wherein said integrator processor receives data from said monitor box via a wireless data transmission.

39. The integrator system of claim 38, wherein the wireless data transmission is operable to be continuous from said monitor box to said integrator processor positioned a distance from the farm house.

40. The integrator system of claim 38, further comprising:
a controller able to control the farm house to achieve the substantially real time optimal conditions based at least in part on substantially real time data from said monitor box sent to said integrator processor.

41. The method of claim 15, wherein sending instructions from the second party to the first party to perform a selected action includes sending instructions substantially wirelessly.

42. The method of claim 31, further comprising:
communicating a data set from at least one of a first monitor box monitoring the first control parameter or a second monitor box monitoring the second control parameter to said processor over a wireless data link;
wherein communicating includes collecting data regarding at least one of the first control parameter or the second control parameter and sending it via said wireless data link at a selected time.

43. The method of claim 42, further comprising:
accessing the data with a website.

44. The method of claim 31, wherein communicating includes transmitting the data set regarding changes from a previous data set.

45. An integrator system to assist in providing a selected product from a farm house having a structure substantially enclosing an area and substantially covering the area, comprising:
an integrator processor positioned a distance from the farm house, said integrator processor determining an optimal quality and yield of the selected product from within the farm house; and
a monitor positioned in the farm house to monitor a selected criterion at the farm house;
wherein said integrator processor receives data at least in part through a wireless transmission from said monitor regarding said selected criterion of the farm house, the data being received by said integrator processor at least one of periodically or continuously; and
wherein said integrator processor compares the received data from the monitor and the optimal quality and yield of the selected product from the farm house.

46. The integrator system of claim 45, further comprising:
a cellular system;
wherein the data is transmitted at least in part via the cellular system.

47. The integrator system of claim 1, wherein the optimal quality and yield of the selected product from the farm house includes at least one a livestock weight, a livestock size, a livestock health, and combinations thereof.

48. The method of claim 15, wherein determining the optimal quality and yield of the selected item from the farm house includes determining at least one of a livestock weight, a livestock size, a livestock health, and combinations thereof.

49. The method of claim 34, wherein the first farm house includes a first structure substantially enclosing a first area and substantially covering the first area, the second farm house includes a second structure substantially enclosing a second area and substantially covering the second area, and an integrator controls said processor comparing, the integrator being at a third position a distance away from each of the first and second positions,
the method further comprising:
determining an optimal quality and yield of the product from each of the first and second farm houses by the integrator, the optimal quality and yield of the product from each of the first and second farm houses including at least one a livestock weight, a livestock size, a livestock health, and combinations thereof;
positioning a first controller in the first farm house;
positioning a second controller in the second farm house; and
controlling, by the integrator, the first controller and the second controller based on the comparison of the first and second result parameters and the determination of the optimal quality and yield of the product from each of the first and second farm houses.

* * * * *

UNITED STATES PATENT AND TRADEMARK OFFICE
CERTIFICATE OF CORRECTION

PATENT NO. : 7,317,968 B2  Page 1 of 1
APPLICATION NO. : 10/674282
DATED : January 8, 2008
INVENTOR(S) : Brad W. Lorton It is certified that error appears in the above-identified patent and that said Letters Patent is hereby corrected as shown below:

In column 1, line 31; delete "breading" and insert --breeding--

In column 1, line 33; delete "breading" and insert --breeding--

In column 5, line 10; insert --be-- between "may" and "appropriate"

In column 5, line 44; insert --be-- between "may" and "owned"

In column 9, line 17; delete "determine" and insert --determining--

In column 18, line 16; insert --of-- between "one" and "a"

In column 18, line 36; insert --of-- between "one" and "a"

Signed and Sealed this

Twenty-seventh Day of May, 2008

JON W. DUDAS
*Director of the United States Patent and Trademark Office*